US011015939B2

(12) United States Patent
Kesting et al.

(10) Patent No.: US 11,015,939 B2
(45) Date of Patent: *May 25, 2021

(54) METHODS AND SYSTEMS FOR DETECTING A CLOSURE AND/OR OPENING OF A NAVIGABLE ELEMENT

(71) Applicant: TomTom Traffic B.V., Amsterdam (NL)

(72) Inventors: Arne Kesting, Amsterdam (NL); Nikolaus Witte, Amsterdam (NL); Christian Lorenz, Amsterdam (NL); Robin Tenhagen, Amsterdam (NL)

(73) Assignee: TOMTOM TRAFFIC B.V., Amsterdam (NL)

( * ) Notice: Subject to any disclaimer, the term of this patent is extended or adjusted under 35 U.S.C. 154(b) by 481 days.

This patent is subject to a terminal disclaimer.

(21) Appl. No.: 15/743,645

(22) PCT Filed: Jul. 15, 2016

(86) PCT No.: PCT/EP2016/066942
§ 371 (c)(1),
(2) Date: Jan. 10, 2018

(87) PCT Pub. No.: WO2017/009464
PCT Pub. Date: Jan. 19, 2017

(65) Prior Publication Data

US 2018/0202816 A1 Jul. 19, 2018

(30) Foreign Application Priority Data

Jul. 16, 2015 (GB) ..................................... 1512490

(51) Int. Cl.
*G01C 21/00* (2006.01)
*G01C 21/32* (2006.01)
*G08G 1/01* (2006.01)

(52) U.S. Cl.
CPC ............ *G01C 21/32* (2013.01); *G08G 1/012* (2013.01); *G08G 1/0112* (2013.01);
(Continued)

(58) Field of Classification Search
CPC ...... G01C 21/32; G08G 1/0112; G08G 1/012; G08G 1/0129; G08G 1/0133; G08G 1/0141
(Continued)

(56) References Cited

U.S. PATENT DOCUMENTS

2007/0032946 A1 2/2007 Goto
2010/0318286 A1 12/2010 Lorkowski
(Continued)

FOREIGN PATENT DOCUMENTS

CN 102938203 2/2013
GB 2428852 2/2007
(Continued)

OTHER PUBLICATIONS

Search report of United Kingdom application 1515487.5 dated Sep. 24, 2015.
(Continued)

*Primary Examiner* — Gertrude Arthur Jeanglaude
(74) *Attorney, Agent, or Firm* — Park, Vaughan, Fleming & Dowler LLP

(57) ABSTRACT

A method of detecting the closure and/or opening of a navigable element forming part of a network of navigable elements within a geographic area. A passability parameter is associated with each segment of an electronic map representing the navigable network and indicates a likelihood of closure of the element represented by the segment. The value of the passability parameter decays over time. When a device is detected on the element represented by the segment, the passability parameter is increased, and when a
(Continued)

closure report is received relating to the segment, the parameter is decreased. In one set of embodiments, when the passability parameter decreases below a first threshold value, the element represented by the segment is determined to be potentially closed. In another set of embodiments, when the passability parameter increases above a second threshold value, the closed element represented by the segment is determined to be opened.

19 Claims, 7 Drawing Sheets

(52) U.S. Cl.
CPC ......... *G08G 1/0129* (2013.01); *G08G 1/0133* (2013.01); *G08G 1/0141* (2013.01)

(58) Field of Classification Search
USPC .......................................................... 701/532
See application file for complete search history.

(56) References Cited

U.S. PATENT DOCUMENTS

| | | | |
|---|---|---|---|
| 2011/0231087 A1 | 9/2011 | Johnson | |
| 2012/0123667 A1 | 5/2012 | Gueziec | |
| 2012/0143492 A1 | 6/2012 | Johnson | |
| 2015/0012510 A1 | 1/2015 | Van der Laan | |
| 2016/0069695 A1* | 3/2016 | Broadbent ......... | G01C 21/3691 701/411 |
| 2018/0209797 A1* | 7/2018 | Kesting ................ | G08G 1/0129 |
| 2018/0252541 A1* | 9/2018 | Kesting .............. | G01C 21/3461 |

FOREIGN PATENT DOCUMENTS

| | | |
|---|---|---|
| JP | 2010020462 | 1/2010 |
| WO | 2009157651 | 12/2009 |
| WO | 2014147200 | 5/2014 |
| WO | 2015134311 | 9/2015 |

OTHER PUBLICATIONS

International search report of international application No. PCT/EP2016/066942 dated Oct. 17, 2016.

Search report of United Kingdom application 1512490.2 dated Dec. 17, 2015.

* cited by examiner

METHODS AND SYSTEMS FOR DETECTING A CLOSURE AND/OR OPENING OF A NAVIGABLE ELEMENT

CROSS-REFERENCE TO RELATED APPLICATIONS

The present application is a National Stage of International Application No. PCT/EP2016/066942, filed on Jul. 15, 2016, and designating the United States, which claims benefit to United Kingdom Patent Application 1512490.2 filed on Jul. 16, 2015. The entire content of these applications is incorporated herein by reference.

FIELD OF THE INVENTION

The present invention relates to methods and systems for detecting the closure and/or opening of a navigable element, e.g. road element, in a navigable network of navigable elements, e.g. a road network.

BACKGROUND TO THE INVENTION

Obtaining information about closures of navigable elements, e.g. roads of a road network, is important in a navigation system. The presence of a road closure has a significant impact upon routing through the road network. A road closure may be likened to a traffic jam associated with an "infinite delay", such that an alternative routing must be determined to avoid the affected road element(s). Knowledge of the existence of a road closure is of importance to road users even if they are not following a pre-calculated route. For example, if a user is following a familiar route, it is still useful for them to be aware if a road closure is present affecting the route so that they may determine an alternative route, with or without the assistance of a navigation system.

Road closure information may be provided to a user, e.g. together with other travel and traffic information, during navigation along a route via an in-vehicle navigation device, such as a portable device (PND) or integrated device, or may be provided as an input to an Advanced Driver Assistance System (ADAS) device. Road closure information may also be used for route planning, e.g. by a navigation or ADAS device, before commencing a journey, or to recalculate a fastest route during a journey if conditions change during traversal along the route.

A road closure is typically a dynamic event, temporarily affecting a road, and it is therefore desirable to be able to obtain information relating to road closures in the context of a "live" system, i.e. indicative of the relatively current condition of the road network.

Conventional systems for obtaining information about road closures typically rely upon data obtained from third parties. For example, such data may be included in "Traffic Message Channel" (TMC) messages that may be broadcast over an FM network, or other similar third party messages. Such information may be based upon data obtained from sources such as police reports, or road agencies/administrators. However, there are some drawbacks in relying upon third party data relating to road closures, since such data is not always accurate, and may not be up to date.

The Applicant has realised that there remains scope for improvement in methods and systems for obtaining information relating to the closure and/or opening of a navigable element, e.g. for provision to users and/or navigation or ADAS devices.

SUMMARY OF THE INVENTION

In accordance with a first aspect of the invention there is provided a method of detecting the closure of a navigable element forming part of a network of navigable elements within a geographic area, the navigable elements being represented by segments of an electronic map, wherein at least some of the segments of the electronic map are each associated with data indicative of a passability parameter for the segment, the passability parameter being indicative of the likelihood of the navigable element represented by the segment being closed, wherein the value of the passability parameter varies according to a predefined function with respect to time such that the likelihood of the navigable element being closed increases with respect to time, said method comprising:

obtaining positional data relating to the movement of a plurality of devices along the navigable elements of the navigable network with respect to time;

modifying, for each of one or more segments, the value of the passability parameter associated with a segment such that the likelihood of the navigable element represented by the segment being closed is decreased, when the positional data indicates that a device has been detected traversing the navigable element;

modifying, for each of one or more segments, the value of the passability parameter associated with a segment such that the likelihood of the navigable element represented by the segment being closed is increased, when a report is received from an external source indicative of the navigable element being closed; and identifying a navigable element as being potentially closed when the value of the passability parameter associated with the segment representing the navigable element passes a predetermined threshold value.

Thus, in accordance with the invention, segments of an electronic map representing real world navigable elements of a navigable network are associated with data indicative of a respective passability parameter. At least some of the segments of the electronic map are associated with data indicative of a passability parameter for the segment. A plurality of the segments, and preferably each segment of the electronic map is associated with such data. The passability parameter has a value which is indicative of the likelihood of the closure of the navigable element represented by the segment. The passability parameter is a dynamically varying parameter. Over time, the value of the passability parameter for a given segment will change in a manner indicating an increased likelihood of the navigable element represented by the segment being closed. In accordance with the invention, the value of the passability parameter is modified when each of two events occur. When positional data indicative of the movement of devices with respect to time, also referred to herein as "probe data", in respect of a navigable element represented by a segment of the electronic map indicates that a device has been detected on the navigable element, the passability parameter associated with the segment is modified so as to indicate a decreased likelihood that the navigable element is closed. Conversely, when a report is received from an external source indicating that the navigable element is closed, the passability parameter associated with the segment representing the navigable element is modified so as to indicate an increased likelihood of closure of the element. If the passability parameter passes a predetermined threshold value, which corresponds to a given likelihood of closure, the navigable element is identified as potentially being closed.

In other words, a navigable element is identified as being potentially closed when the passablity parameter associated with the segment representing the navigable element passes the threshold value due to the variation, e.g. decay, according to the predefined function and due to the receipt of any external closure reports for the element and further due to the lack, or an insufficient amount, of positional data for the segment.

In this way, the passability parameter enables the identification of a potentially closed navigable element, also referred to herein as a closure candidate segment, to be based upon different types of evidence, including both probe data evidence and external reports as to closure, also referred to herein as external closure reports. It has been found that this may result in more reliable identification of closure candidate segments. While probe data, or in fact a lack thereof, may provide a useful indication as to closure, e.g. when a device has not been detected on the element in the applicable direction of travel according to the probe data for some time, such data may not always provide conclusive evidence of closure. For example, there may be inadequacies in the coverage of probe data. Probe data obtained from devices associated with different forms of transport may provide misleading picture. For example, construction vehicles may be detected on a road which is closed to other users. Cyclists or pedestrians may be found on a road which is closed to vehicles. Other problems may result from inaccurate map matching of probe data to segments of the electronic map, which might wrongly suggest an element is open or closed. Similarly, external reports as to the closure of an element, e.g. from users traversing the navigable network, from moderators, from governmental sources, or third party traffic information systems, may not always be accurate, or at least may not correctly identify the element(s) actually closed. Furthermore, due to the time needed to obtain sufficient probe data to identify a closure, temporary (or short term) closures may not always be detected using probe data, e.g. a closure of less than 15 minutes. It is therefore desirable to take into account multiple sources of closure information in order to reach a determination that a navigable element is potentially closed, so that a closure determination is based upon corroboration between at least an external closure report and probe data. This is achieved by associating a passability parameter with the segment representing a navigable element, whose value is influenced by at least these factors. The extent to which the passability parameter is influenced by the different factors, and the threshold used to identify an element as potentially closed in the given direction to which the parameter relates may be tuned as desired to weight the various factors, and provide a desired reliability for a particular application. Further factors may readily be taken into account if desired by causing the passability parameter to be influenced by those factors. The passability parameter therefore provides a simple and effective way to identify closure candidate elements based upon various types of information, from multiple sources.

The present invention extends to a system for carrying out a method in accordance with any of the embodiments of the invention described herein.

In accordance with a second aspect of the invention there is provided a system for detecting the closure of a navigable element forming part of a network of navigable elements within a geographic area, the navigable elements being represented by segments of an electronic map, wherein at least some of the segments of the electronic map are each associated with data indicative of a passability parameter for the segment, the passability parameter being indicative of the likelihood of the navigable element represented by the segment being closed, wherein the value of the passability parameter varies according to a predefined function with respect to time such that the likelihood of the navigable element being closed increases with respect to time, said system comprising:

means for obtaining positional data relating to the movement of a plurality of devices along the navigable elements of the navigable network with respect to time;

means for modifying, for each of one or more segments, the value of the passability parameter associated with a segment such that the likelihood of the navigable element represented by the segment being closed is decreased, when the positional data indicates that a device has been detected traversing the navigable element;

means for modifying, for each of one or more segments, the value of the passability parameter associated with a segment such that the likelihood of the navigable element represented by the segment being closed is increased, when a report is received from an external source indicative of the navigable element being closed; and means for identifying a navigable element as being potentially closed when the value of the passability parameter associated with the segment representing the navigable element passes a predetermined threshold value.

The present invention in these further aspects may include any or all of the features described in relation to the first and second aspects of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, data indicative of a determined potential closure, data indicative of passability parameters for segments, and/or the positional data or reports used to determine the existence of a potential closure.

The methods of the present invention are, in preferred embodiments, implemented by a server. In other words, the methods of the presented invention are preferably computer implemented methods. Thus, in embodiments, the system of the present invention comprises a server comprising the means for carrying out the various steps described, and the method steps described herein are carried out by a server.

The present invention considers positional data relating to the movement of a plurality of devices with respect to time along navigable elements and external closure reports to determine whether elements of the network are closure candidates, i.e. elements that are potentially closed. The steps of modifying the passability parameter associated with segments of the electronic map in accordance with the invention in any of its embodiments are carried out in relation to one or more segments of the electronic map, and are preferably carried out in relation to a set of a plurality of segments, or each segment of the electronic map. The segments may be any segment representing a navigable element in respect of which appropriate positional data is available to enable the method to be performed.

It will be appreciated that the network of navigable elements, and any navigable element, as referred to herein, are navigable elements of a real world or physical navigable network. The network is represented electronically by electronic map data. The electronic map data may be stored by or otherwise accessible by the server, in embodiments in which the method is implemented using a server. In the electronic map data, the navigable network is represented by a plurality of segments connected by nodes. Each segment of the electronic map represents at least a portion of navigable element of the navigable network. A segment may represent a portion of a navigable element of the navigable network, e.g. the carriageway in a particular direction of travel or a portion of the length thereof. In such cases, the passability parameter for the segment indicates the likelihood of the portion of the element being closed. The value of the parameter is modified where positional data indicates that a device has been detected on the portion of the element or where a closure report is received relating to the portion of the element. The method then comprises identifying when the portion of the element is potentially closed when the value of the passability parameter passes the predetermined threshold.

As will be appreciated a navigable segment as referred to herein may be uni-directional or bi-directional. Thus, the passability parameter relates to the likelihood of closure of the segment in the or a given direction of travel permitted on the segment. A navigable element of the navigable network may be represented by more than one segment of the electronic map. For example, lanes for travel in one direction may be represented by a different segment to those for travel in an opposite direction. Such an element may be represented by two uni-directional segments of the electronic map. The passability parameter associated with a segment is indicative of the likelihood of closure of the element represented by the segment in a given direction of travel. The value of the passability parameter associated with the navigable segment representing an element is modified so that the likelihood of the element being closed in the at least one direction indicated by the passability parameter decreases when the positional data indicates that a device has been detected on the element moving in the applicable direction of travel. Thus, the positional data that is used is that relating to the applicable direction of travel. Similarly, the modification of the value of the passability parameter associated with a segment representing an element occurs when a report is received from an external source indicative of the element being closed in the given direction of travel. A determination as to potential closure of a navigable element relates to the particular direction of travel considered.

The present invention may be implemented in relation to navigable elements of any type. Preferably the navigable elements are road elements (of a road network). In some embodiments the navigable element(s) are elements of a highway, but it will be appreciated that the techniques are applicable to any type of road element, or indeed other type of navigable element, where appropriate positional data exists or can be determined. While exemplary embodiments refer to road elements of a road network, it will be appreciated that the invention is applicable to any form of navigable element, including elements of a path, river, canal, cycle path, tow path, railway line, or the like. For ease of reference these are commonly referred to as a road element of a road network. The present invention is therefore applicable to detecting a closure of any navigable element.

The positional data used in accordance with the invention is positional data relating to the movement of a plurality of devices along the or each navigable element with respect to time. The method may comprise obtaining positional data relating to the movement of a plurality of devices with respect to time in the network of navigable elements, and filtering the positional data to obtain positional data relating to the movement of a plurality of devices along a given navigable element with respect to time in the applicable direction. The step of obtaining the positional data relating to the movement of devices along a navigable element may be carried out by reference to the electronic map data indicative of the navigable segment representing the navigable element of the network. The method may involve the step of matching positional data relating to the movement of devices in a geographic region including the network of navigable elements to at least the or each navigable segment of the electronic map that is being considered in accordance with the invention.

In some arrangements the step of obtaining the positional data may comprise accessing the data, i.e. the data being previously received and stored. For "live" positional data, it will be appreciated that the data may be stored shortly before being used, so that it may still be considered to be live data. In other arrangements the method may comprise receiving the positional data from the devices. In embodiments in which the step of obtaining the data involves receiving the data from the devices, it is envisaged that the method may further comprise storing the received positional data before proceeding to carry out the other steps of the present invention, and optionally filtering the data. The step of receiving the positional data need not take place at the same time or place as the other step or steps of the method.

The positional data used in accordance with the invention is collected from a plurality of devices, and relates to the movement of the devices with respect to time. Thus, the devices are mobile devices. It will be appreciated that at least some of the positional data is associated with temporal data, e.g. a timestamp. For the purposes of the present invention, however, it is not necessary that all positional data is associated with temporal data, provided that it may be used to provide the information relating to the movement of devices along a navigable element in accordance with the present invention. However, in preferred embodiments all positional data is associated with temporal data, e.g. a timestamp.

The positional data relates to the movement of the devices with respect to time, and may be used to provide a positional "trace" of the path taken by the device. As mentioned above, the data may be received from the device(s) or may first be stored. The devices may be any mobile devices that are capable of providing the positional data and sufficient associated timing data for the purposes of the present invention. The device may be any device having position determining capability. For example, the device may comprise means for accessing and receiving information from WiFi access points or cellular communication networks, such as a GSM device, and using this information to determine its location. In preferred embodiments, however, the device comprises a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, position sensors, etc.

Preferably the device is associated with a vehicle. In these embodiments the position of the device will correspond to the position of the vehicle. References to positional data obtained from devices associated with vehicles, may be replaced by a reference to positional data obtained from a vehicle, and references to the movement of a device or devices may be replaced by a reference to the movement of a vehicle, and vice versa, if not explicitly mentioned. The device may be integrated with the vehicle, or may be a separate device associated with the vehicle such as a portable navigation apparatus. The positional data obtained from the plurality of devices is commonly known as "probe data". Data obtained from devices associated with vehicles may be referred to as vehicle probe data. References to "probe data" herein should therefore be understood as being interchangeable with the term "positional data", and the positional data may be referred to as probe data for brevity herein. Of course, the positional data may be obtained from a combination of different devices, or a single type of device. However, the present invention is not limited to the use of positional data obtained from a particular type of device, or devices associated with a particular form of transport, e.g. vehicles, and probe data from devices associated with multiple forms of transport may equally be taken into account. Typically, any probe data indicative of the movement of a device with respect to time along a navigable element may be used to determine the potential closure of the element. As the identification of a particular navigable element as being potentially closed is based additionally on external closure reports in accordance with the invention, and not solely upon probe data, any inconclusiveness in the probe data as a result of it being based upon devices associated with different forms of transport may be reduced, as the closure determination requires corroboration from a different source of information. The need to exclude probe data obtained from devices associated with vehicles, e.g. construction vehicles, or other forms of transport which may be able to traverse elements which are generally not open to the public may be avoided.

The present invention may provide "live", i.e. short term, detection of closures based on current or near current data. For live positional data, it will be appreciated that the data may be stored shortly before being used, so that it may still be considered to be live data.

The method of the present invention preferably involves obtaining and using "live" positional data relating to the movement of a plurality of devices with respect to time along the or each navigable element (in the applicable direction of travel). Live data may be thought of as data which is relatively current and provides an indication of relatively current conditions on each alternative navigable element. The live data may typically relate to the conditions on the elements within the last 30 minutes, 15 minutes, 10 minutes or 5 minutes. By using live positional data in determining the closure information, it may be assumed that the information determined is currently applicable, and may be applicable in the future, at least in the shorter term. The use of live positional data allows accurate and up to date closure information to be determined, that can be relied upon by road users and/or navigation devices or ADAS. Preferably the positional data that is used in accordance with the invention is or comprises live positional data.

In accordance with the invention, at least some of the segments of the electronic map are associated with data indicative of a passability parameter for the segment. The passability parameter is indicative of the likelihood of the navigable element represented by the segment being closed. As a segment is directional, the passability parameter refers to the likelihood of the navigable element represented by the segment being closed in a given direction. Where a segment is bi-directional, passability parameters may be associated with the segment in respect of each of the different directions of travel along the navigable element represented by the segment. The (or each) passability parameter associated with a segment is a dynamically varying parameter. Where multiple passability parameters are associated with a segment for different directions of travel, each may be modified and used in accordance with any of the embodiments described below. The value of the passability parameter is arranged to vary so that the likelihood of the navigable element (represented by the segment) being closed in the given direction indicated by the parameter increases with respect to time. It will be appreciated that the value of the parameter varies in this manner subject to any modification that may be carried out based upon consideration of probe data or closure report(s) received.

Preferably the passability parameter continually varies with respect to time other than at those times than when it is modified based on probe data or receipt of a closure report. The method may comprise the passability parameter varying so that the likelihood of the element being closed indicated by the parameter increases with respect to time in accordance with the predefined function, until such time as, and once, the value of the passability parameter has been modified when positional data indicates that a device has been detected on the element moving in the applicable direction and/or the value of the passability parameter has been modified once a report is received from an external source indicative of the element being closed. In these embodiments, the modification of the parameter may provide a variation of the value of the parameter to indicate an increased or decreased likelihood of closure as appropriate, and provide a new starting point from which the value of the parameter will vary over time to indicate an increased likelihood of closure.

In preferred embodiments the modification of the passability parameter as a result of the detection of a device on the element represented by the segment or as a result of a report being received from an external source indicative of the closure of the element provides a discrete step in the value of the parameter, i.e. a discrete jump or drop as appropriate. The magnitude of the step may be set as desired. In some embodiments the discrete step in respect of the detection of a device on the element according to the positional data is a fixed step, i.e. whenever a device is detected, the parameter undergoes the same fixed step in value. The discrete step in respect of a report being received from an external source indicative of the closure of the element may similarly be a fixed step. Where the steps are fixed, they may be set the same or differently for the modifications based upon detection of a device and receipt of a closure report. However, although use of fixed steps may be particularly simple, it is envisaged that variable size steps for modifications in respect of the detection of different devices on the segment, or the receipt of different reports may be used. As discussed below, in some embodiments, the magnitude of the step in the case of a received report may vary dependent upon the source of the report. Similarly, the modifications in respect of reports or detected devices need not provide discrete steps in the value of the parameter.

Preferably the method comprises modifying the value of the passability parameter so that the likelihood of the element being closed as indicated by the passability parameter decreases each time a device is detected on the element represented by the segment. The detection of each device may provide another discrete step in the value of the parameter. Preferably the method comprises modifying the value of the passability parameter so that the likelihood of the element being closed as indicated by the passability parameter increases each time a closure report is received indicating the closure of an element represented by the segment. The detection of each device or the receipt of each report may provide another discrete step in the value of the parameter.

The passability parameter may be such that higher values of the parameter indicate a greater likelihood of closure of the element, and lower values a lesser likelihood of closure of the element, or vice versa. Modifying the value of the parameter to indicate an increased likelihood of closure may therefore involve increasing or decreasing the value of the parameter, and vice versa when modifying the value of the parameter to indicate a decreased likelihood of closure.

In preferred embodiments, however, the passability parameter is such that lower values of the parameter indicate a greater likelihood of closure of the element, and higher values a lesser likelihood of closure of the element. In these embodiments the value of the passability parameter decreases with respect to time so that the likelihood of the element being closed (as indicated by the parameter) increases with respect to time. The step of modifying the value of the passability parameter so that the likelihood of the element being closed decreases when a device is detected on the element moving in the applicable direction of travel then comprises increasing the value of the parameter. The step of modifying the value of the passability parameter so that the likelihood of the element being closed increases when at least one report is received from an external source indicative of the element being closed then comprises decreasing the value of the parameter. The method then comprises identifying a navigable element being potentially closed when the value of the passability parameter associated with the segment representing the element decreases below a predetermined threshold value.

The value of the passability parameter varies so that the likelihood of the element being closed as indicated by the parameter increases with respect to time in accordance with a predefined function. Preferably the passability parameter decreases with respect to time, and the predefined function is a decay function, i.e. causing the value of the passability parameter to decrease (or age) over time. The predefined function, e.g. decay function, that is used to age the passability parameter associated with a segment may be of any suitable form. For example, the decay function may be at least one of: a linear function, an exponential function, and a polynomial (e.g. quadratic, cubic, etc) function. Preferably the decay function is an exponential function. In some preferred embodiments, each modification of the value of the passability parameter in respect of the detection of a device on the element or the receipt of a closure report provides a discrete step in the value of the passability parameter to provide a new starting point from which the value of the parameter then decays with respect to time.

The passability parameter may be in any manner indicative of the likelihood of closure of the element represented by the segment with which it is associated. In preferred embodiments the passability parameter is based upon an expected flow of traffic along the element, and preferably upon a time dependent expected flow of traffic. The passability parameter at any given time is then based upon the expected flow of traffic applicable for that time. Traffic may refer to any type of objects or persons which may travel along the relevant element, e.g. vehicles, pedestrians, etc. The flow of traffic may be indicated by the flow of devices along the segment according to the positional data. It will be appreciated that the passability is additionally subject to the variation with respect to time according to the predefined function, e.g. decay, and any modification in respect of detected devices or received reports as described above.

Preferably the passability parameter is based upon an expected time interval between consecutive devices being detected on the segment (which may be referred to as an expected "visit interval"). The expected time interval for an element may be determined by analysing positional data relating to the movement of devices along the navigable element with respect to time. However, it may alternatively be derived using other techniques e.g. theoretical techniques, or combinations thereof. Thus, the interval is a statistical expectation of the period of time between which consecutive probe devices are expected to be detected traversing the navigable element; and may or may not be based upon intervals between actually detected devices. In preferred embodiments the expected time interval is based upon historical positional data relating to the movement of devices, e.g. associated with vehicles, along the element with respect to time. The expected time interval is preferably based on an average time interval; for example based upon a plurality of (detected) time intervals between consecutive pairs of devices passing along the element according to historical positional data. Where the expected time interval is based on an average time interval, it may be based upon any type of average e.g. a mean. Where the expected time interval is based upon historical positional data it may be an average determined based upon historical positional data relating to any given time period, e.g. the last week or month, etc.

The passability parameter may be based in any manner upon the expected time interval between consecutive devices detected on the element. Preferably a rate at which the value of the passability parameter varies with respect to time according to the predefined function is based at least in part on the expected time interval. This may be achieved by arranging the predefined function according to which the parameter varies to be based at least in part on the expected time interval. In preferred embodiments in which the value of the passability parameter decreases with respect to time, the rate of decrease of the passability parameter is preferably dependent upon an inverse of the expected time interval (and the predefined function is preferably dependent upon an inverse of the expected time interval). In this way, where a greater interval between devices is expected, the rate of decrease of the parameter will be less great than where a lesser interval between devices is expected. This may avoid a threshold indicative of closure being reached prematurely for less busy elements, for which fewer devices are expected to be detected to prompt an increase in the parameter. Of course, where the passability parameter increases with respect to time, the rate of decrease may conversely be dependent upon the expected time interval.

It will be appreciated that the expected flow along an element will typically vary with respect to time. For example, the flow along an element e.g. as indicated by an expected time interval between devices being detected on the element, will typically vary over the course of the day, with the expected time interval being smaller at busier times. In preferred embodiments the expected time interval upon which the passability parameter is preferably based is time dependent. Thus, the passability parameter for any given time is based on the expected time interval applicable to the current time. This may be achieved in various manners. The method may comprise, at different times, updating the expected time interval (and hence the value of the passability parameter) associated with each segment based upon a current time. This may be carried out continually, e.g. for each instant in time, or at intervals, e.g. after the expiry of a predetermined period for which a particular expected time interval may be considered applicable. The expected time interval may be in respect of an instantaneous time, or a predetermined time period, such as 15 minutes, 30 minutes, or any desired period. A predetermined time period may be chosen by reference to correspond to a time period typically used when refreshing or analysing positional data.

In some embodiments in which the expected time interval is an average expected time interval, a new average expected time interval between consecutive devices may be determined based upon current positional data for each new time, e.g. relating to a single time or an applicable time period. However, this may be computationally complex. In some preferred embodiments, therefore, the expected time interval is an average expected time interval, and the same average expected time interval is used for multiple different times, e.g. instantaneous times or time periods. The average expected time interval may then be made applicable to the current time by scaling the average expected time interval based upon current conditions in the navigable network to provide an expected time interval applicable to the current time. For example, in an embodiment, the number of concurrent probe devices from which "live" data is currently being received can be used to scale the expected time interval. As will be understood, the number of concurrent probe devices will typically be higher during peak hours, and thus the expected time interval is preferably reduced during these hours and increased during off-peak hours, e.g. during the night, week-ends and/or bank holidays. Accordingly, there is preferably an inverse relationship between the value of the expected time interval to be used in the method at a given time and the number of concurrent probe devices from which positional data is being received. In some preferred embodiments the time dependent expected time interval is obtained by scaling an average expected time interval based upon a ratio between a current number of concurrent probe devices and the average number of concurrent probe devices expected in the system. The average number of concurrent probe devices may be an average over a month, week or any suitable time frame. The ratio will then provide an indication as to whether it is a relatively busy or relatively quiet time. These techniques may be more procedurally efficient, allowing an average expected time interval to be determined and used over a longer period, e.g. a month or week, with scaling based upon the current number of concurrent probe devices to provide it with time dependence.

In accordance with the invention in any of its embodiments, the value of the passability parameter is preferably bounded, e.g. between 0 and 1. This provides ease of comparison between the values of parameters for different segments, and at different times. The passability parameter therefore provides an indication of the relative likelihood of closure of the segment. For example, the passability parameter for a segment can be bounded by the expected time interval for the segment. The reason for this is that it is typically not of interest in the context of detecting closed segments to know that the expected flow along a segment is greater than expected, only that the expected flow is less than expected. Thus, in embodiments, the passability parameter can vary between an upper limit, e.g. 1, which is representative of flow along the navigable element represented by the segment at an expected or greater than expected level, and a lower limit, e.g. 0, which is representative of zero flow. It should be appreciated, however, that due to probe data from construction vehicles or wrongly map matched probe data, it is unlikely that any segment will actually ever have a passability equal to the lower limit, e.g. 0.

The method comprises modifying the value of the passability parameter when a report is received from an external source indicative of the element represented by the segment associated with the parameter being closed. The external source is external to the system, e.g. providing a closure report that is independent to any such determination based on probe data. The value may be modified each time that a report is received. The method may comprise modifying the value of the passability parameter when each one of a plurality of reports are received indicative of the element being closed, the reports being obtained from different external sources. Reports may be obtained from any one of a number of external sources. As the report is only used to modify the value of the passability parameter to indicate an increased likelihood of closure, it is not necessary to verify the reliability of the source, as the information must typically be corroborated by at least probe data before a possible closure is identified. Furthermore, the present invention allows reports to be taken into account in the same manner regardless of their origin, with the passability parameter providing a simple way to fuse reports received from various sources. By way of example the report may be any one of: a user report (such as may be received via a navigation device, website, etc.); an automatically generated report, such as may be generated when a navigation device deviates from a planned route, changes heading suddenly, accelerates/decelerates when not expected; a governmental feed; a journalistic feed; or a human moderated feed.

Reports may identify the geographic location of a road closure in any manner as desired. For example, a report may provide a point location, a line location or an area location. The point location may, for example, be the location of a navigation device when the user reported a navigable element, e.g. road, closure. Such a point location can be used to identify a single segment in the map that is reported as being closed, or it may be used to identify a plurality of segments, e.g. all the segments within an area centred on the point location, that are reported as being closed. The line location may be the actual identity of the segment, or plurality of segments, on a digital map reported by a user as being closed. The area location may, for example, be defined by a user providing a plurality of points on a digital map that together define an enclosed geographic region. Such an area location can be used to identity a plurality of segments within the defined area; all of which are reported as being closed. The method may, in any of these cases, comprise identifying the or each segment of the electronic map to which a received closure report relates, and modifying the passability parameter of the or each identified segment. This may be achieved using a suitable map matching technique.

In some embodiments, the degree to which the value of the passability parameter is modified when a closure report is received may be dependent upon the source of the report, e.g. dependent upon the reliability of the source. For example a report from a more "official" source, such as a government feed, may prompt a larger change in the parameter than a user closure report, which may be less reliable. It is envisaged that a report from a reliable source might prompt a change in the passablity parameter value to a level bringing it past the predetermined threshold used to trigger an identification that the element is potentially closed.

In some embodiments, the method may comprise additionally modifying the value of the passability parameter associated with one or more further navigable segment connected thereto in a manner to increase the likelihood of that element being closed when a report is received that prompts modification of the passability parameter associated with a given navigable segment. The or each connected segment may be an adjacent navigable segment to the navigable segment in respect of which the report is received, or may be a segment representing a navigable element that is known to also usually be closed when the element represented by the navigable segment in respect of which the report is received is closed e.g. based upon historic data. The degree to which the passability parameter is modified for these additional segment(s) may be the same amount or a lesser amount than for the original navigable segment in relation to which the report is received.

In accordance with the invention a navigable element is determined as being potentially closed when the passability parameter of the segment representing the element passes a predetermined threshold, e.g. falls below the threshold. The threshold may be set as desired.

The methods of the present invention are computer implemented, and may provide the ability to automatically detect potentially closed segments, and thus the navigable elements thereby. When a segment is identified as potentially closed, the method may comprise the step of automatically generating a message indicative of the potentially closed state of the segment. The message may trigger further validation steps to be performed (e.g. as discussed in more detail below). It is envisaged that the methods of the invention may be implemented continually by a server or servers, as live positional data relating to the movement of devices in the navigable network is received.

The or each segment element that is identified as being potentially closed can be referred to as a candidate closed segment. Preferably a plurality of candidate segments are identified. While it may be assumed with no further validation that a determined candidate closed segment is indeed closed, i.e. that vehicles or other traffic is not able to traverse the navigable element represented by the segment, e.g. due to roadworks, an accident or the like, preferably some additional validation is carried out to help further reduce false positives. For example, validation of a segment being potentially closed may be carried out using other sources of data which may corroborate the presence of a closure or otherwise. In some embodiments the validation is carried out using one or more external reports as to the closure of the element represented by the segment. Thus, external closure reports may once again be used in this final validation stage. The method may comprise validating a candidate closed segment as being closed when at least one report has been received from an external source indicative of a navigable stretch comprising at least a portion of one or more navigable elements as being closed, which stretch includes or at least partially overlaps with the navigable element represented by the candidate segment.

Preferably the method comprises validating each of the identified candidate segments, which are potentially closed, to identify a set of segments that can be validated as being closed.

The validation step may alternatively or additionally involve aggregating segments to identify a navigable stretch including a plurality of navigable elements as being closed. For example, where first and second disconnected segments have been identified as closed, the method may comprise identifying one or more additional segments connecting the first and second segments as being closed, since sometimes an intermediate segment may not have been determined as being closed, e.g. due to an absence of closure reports and/or inadequacy in probe data coverage.

The result of validation will be a set of segments, and thus a set of navigable elements, that are considered to be closed with an appropriate degree of confidence.

In accordance with the invention in any of its embodiments involving the determination of a closure of a navigable element, once a determination has been made that a closure exists affecting navigable element, and, in preferred embodiments, validated, the information may be used in various manners. In some embodiments the method comprises associating data indicative of the existence of the (preferably validated) closure with data indicative of the segment of the electronic map representing the navigable element. The method therefore may comprise storing data indicative of the existence of the (preferably validated) closure, preferably in association with data indicative of the navigable segment. The method may comprise using the determined data indicative of a closure in calculating a route and/or in providing traffic information, e.g. to devices associated with vehicles. The method may comprise providing information indicative of the determined (preferably validated) closure to a third party, e.g. a traffic information provider or a traffic management centre, or directly to one or more remote devices, e.g. navigation devices.

In accordance with further aspects and embodiments of the invention, the value of the passability parameter associated with a segment representing a potentially closed navigable element or a closed navigable element, i.e. after validation as discussed above, can additionally or alternatively be used to (re)open the navigable element.

Thus, in accordance with a further aspect of the invention, there is provided a method of detecting the opening of a navigable element forming part of a network of navigable elements within a geographic area, the navigable elements being represented by segments of an electronic map, wherein at least some of the segments of the electronic map are each associated with data indicative of a passability parameter for the segment, the passability parameter being indicative of the likelihood of the navigable element represented by the segment being closed, wherein the value of the passability parameter varies according to a predefined function with respect to time such that the likelihood of the navigable element being closed increases with respect to time, said method comprising:

obtaining positional data relating to the movement of a plurality of devices along the navigable elements of the navigable network with respect to time;

modifying, for each of one or more segments, the value of the passability parameter associated with a segment such that the likelihood of the navigable element represented by the segment being closed is decreased, when the positional data indicates that a device has been detected traversing the navigable element;

modifying, for each of one or more segments, the value of the passability parameter associated with a segment such that the likelihood of the navigable element represented by the segment being closed is increased, when a report is received from an external source indicative of the navigable element being closed; and identifying a potentially closed navigable element as being opened when the value of the passability parameter associated with the segment representing the navigable element passes a predetermined threshold value.

The present invention further extends to a system for carrying out a method in accordance with any of the embodiments of the invention described herein.

Accordingly, in accordance with another aspect of the invention there is provided a system for detecting the opening of a navigable element forming part of a network of navigable elements within a geographic area, the navigable elements being represented by segments of an electronic map, wherein at least some of the segments of the electronic map are each associated with data indicative of a passability parameter for the segment, the passability parameter being indicative of the likelihood of the navigable element represented by the segment being closed, wherein the value of the passability parameter varies according to a predefined function with respect to time such that the likelihood of the navigable element being closed increases with respect to time, said method comprising:

means for obtaining positional data relating to the movement of a plurality of devices along the navigable elements of the navigable network with respect to time;

means for modifying, for each of one or more segments, the value of the passability parameter associated with a segment such that the likelihood of the navigable element represented by the segment being closed is decreased, when the positional data indicates that a device has been detected traversing the navigable element;

means for modifying, for each of one or more segments, the value of the passability parameter associated with a segment such that the likelihood of the navigable element represented by the segment being closed is increased, when a report is received from an external source indicative of the navigable element being closed; and means for identifying a potentially closed navigable element as being opened when the value of the passability parameter associated with the segment representing the navigable element passes a predetermined threshold value.

The present invention in these further aspects may include any or all of the features described in relation to the first and second aspects of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, data indicative of a determined potential closure, data indicative of passability parameters for segments, and/or the positional data or reports used to determine the existence of a potential closure.

The methods of the present invention are, in preferred embodiments, implemented by a server. In other words, the methods of the presented invention are preferably computer implemented methods. Thus, in embodiments, the system of the present invention comprises a server comprising the means for carrying out the various steps described, and the method steps described herein are carried out by a server.

As will be appreciated, these latter aspects and embodiments of the invention relating to the opening of closed navigable segments can be, and preferably are, used in combination with the aspects and embodiments of the invention previously described relating to the closing of open navigable segments. For example, a navigable element can be identified as being potentially closed when the value of the passablity parameter associated with the segment representing the navigable element passes a first predetermined threshold value, and navigable element can be identified as being open wherein the predetermined threshold value used to identify the navigable element as being reopened when the value of the passablity parameter associated with the segment representing the navigable element passes a second predetermined threshold value, wherein the second predetermined threshold value is indicative of a lesser likelihood of closure than the first predetermined threshold value. This use of different thresholds to detect the potential closure of an element and its reopening ensures that there is some hysteresis between the determination of the closed and (re)opened states of the element, preventing the determined state from rapidly oscillating between closed and open.

It will be appreciated that references to an element or segment being determined to be reopened, or opened again, or similar herein, refer to any situation in which an element or segment can be deemed to be open once again following a determination that the element or segment is potentially closed, whether or not the determination of potential closure was accurate. Thus, this may include cases in which the element was, in reality closed, and reopens, e.g. following a validated closure, or where the element is deemed to be open once again following an incorrect determination that it was potentially closed.

The method of the present invention thus preferably involves identifying a navigable element as being reopened when the value of the passability parameter associated with the segment representing the navigable element passes a predetermined threshold value. This predetermined threshold value is preferably indicative of a lesser likelihood of closure than a different predetermined threshold value that was used to identify the navigable element as potentially being closed. In preferred embodiments in which the passability parameter is such that lower values of the parameter indicate a greater likelihood of closure of the element, and higher values a lesser likelihood of closure of the element, the second predetermined threshold value is a higher value than the first predetermined threshold value.

The first and second predetermined thresholds may both be fixed, or both be variable, or a combination thereof. The first and second thresholds are predetermined in that they are set in advance, whether being set to a given value, or so as to vary e.g. with respect to time, such as according to a predefined function. In some embodiments the second predetermined threshold is a variable threshold which varies with respect to time, and the first threshold is a fixed threshold. In other embodiments the second predetermined threshold is a fixed threshold that is set differently for different situations. A value of the second predetermined threshold used to determine whether a navigable element may be considered to be open is preferably set dependent upon the factor or factors which caused the passability parameter associated with the segment to pass the first predetermined threshold i.e. be identified as potentially closed. The value that is so set may be a value of a fixed threshold, or an initial or final value of a variable second threshold. Whether or not at least one of the thresholds is variable, preferably the second predetermined threshold is always associated with a passability value indicative of a lesser likelihood of closure than the first predetermined threshold e.g. a higher passability value.

Turning to the predetermined threshold used to identify a reopening of an element, e.g. the second predetermined threshold value, the threshold may be set differently for different navigable elements. In some preferred embodiments a value of the second predetermined threshold is set at a first value when the navigable element was determined to be potentially closed based upon only one source of information, and the value of the second predetermined threshold is set at a second value where the navigable element was determined to be potentially closed based upon more than one different source of information, wherein the first value is indicative of a greater likelihood of closure than the second value. The value of the second predetermined threshold may be a value of a fixed such threshold, or an initial, or more preferably final value of a variable second threshold. The first value may be used where the element was determined to be potentially closed based upon the assessment of positional data only, and the second value used where the determination of potential closure was additionally based upon the receipt of one or more external report. In some embodiments a value of the second predetermined threshold is set at a first value when the navigable element was deemed to be potentially closed without modification of the passability parameter as a result of the receipt of a report from an external source that the navigable element was closed, and the value of the second predetermined threshold is set at a second value where the navigable element was determined to be potentially closed after modification of the passability parameter as a result of the receipt of one or more report from an external source that the navigable element was closed, wherein the first value is indicative of a greater likelihood of closure than the second value. In these embodiments the value of the second predetermined threshold may be fixed. Alternatively where the second predetermined threshold is variable, a final value of the threshold may be set to either the first or second value as appropriate. Thus, where the navigable element was deemed to be potentially closed after receipt of an external report, the change in the passability parameter required to result in an identification that the element has reopened is greater than that required to reach such an identification when the element was closed without reference to such a report e.g. based upon an absence of, or insufficient amount of positional data alone. This reflects that a determination of closure based at least in part upon an external report is likely to be more reliable than one based upon other factors, such as positional data alone. This may help to ensure that elements incorrectly determined to be closed may be reopened without delay.

Alternatively or additionally, in some embodiments the second predetermined threshold is variable so as to require a greater likelihood of closure over time and thereby approach the first predetermined threshold. The second predetermined threshold varies over time toward the first predetermined threshold. The second predetermined threshold may vary over time in accordance with a predetermined function. Preferably the second predetermined threshold decreases e.g. decays with respect to time. The predetermined function may be e.g. a linear function, an exponential function, or a polynomial (e.g. quadratic, cubic, etc) function, or any other appropriate function, although is preferably an exponential function. The rate of change of the second predetermined threshold may be set as desired e.g. to give an appropriate half life. The second predetermined threshold varies over time such that it does not reach the first predetermined threshold. The second predetermined threshold may vary over time from an initial value to a final value, wherein the final value of the second predetermined threshold is indicative of a lesser likelihood of closure than the first predetermined threshold. In other words, although the second predetermined threshold may approach the first predetermined threshold, the second predetermined threshold remains indicative of a lesser likelihood of closure than the first predetermined threshold. The initial and final values of the second predetermined threshold may be any suitable i.e. predetermined values. The second predetermined threshold may remain at the final value once reached i.e. remaining at a fixed value. The final value of the second predetermined threshold may be the usual value of the second predetermined threshold used i.e. dependent upon the source(s) of information used to reach the closure identification as in the embodiments described above. Typically the time varying second predetermined threshold is used where the identification of the element being closed was based at least in part upon the receipt of an external closure report, and the final value of the second predetermined threshold may then be the usual value for such situations.

In preferred embodiments the second predetermined threshold is arranged to vary with respect to time in any of the above described manners when the passability value associated with the segment has passed the first threshold to be identified as potentially closed as a result of the receipt of an external closure report. The method may comprise modifying the passability parameter associated with a segment so that the value of the passability parameter passes the first predetermined threshold once an external closure report is received, and providing a second predetermined threshold that varies from an initial value to a final value over time, wherein the initial value is indicative of a lesser likelihood of closure than the final value. The step of identifying the segment as being closed and setting the second predetermined threshold to the initial value may be carried out as soon as the report is received. Typically an external closure report is associated with a start time indicative of the time from which the element is to be closed. The method may comprise identifying the segment as being closed and setting the second predetermined threshold to the initial value at a start time associated with the external report. The start time may or may not correspond to the time of receipt of the report.

In embodiments as described above in which the second predetermined threshold is arranged to vary i.e. relax from an initial value to a final value, this may reduce the risk of an element being identified as being open too soon after being identified as closed e.g. upon receipt of a small amount of probe data. This may help to avoid the state of an element oscillating rapidly between closed and open.

Where an element has been determined to be closed as a result of the receipt of an external closure report, the method may comprise, when the report is no longer applicable, modifying the value of the passability parameter associated with the segment representing the element to be indicative of a likelihood of closure that is less than that associated with either of the first or the second predetermined thresholds (or a third predetermined threshold where used). For example, this may be carried out when the report expires e.g. after expiry of a time period of validity of the report.

After an element has been identified as being reopened i.e. after the passability parameter associated therewith passes the second predetermined threshold, the element may subsequently be identified as being closed once more if the passability parameter associated with the segment representing the element passes an appropriate threshold. The first predetermined threshold may be used again to identify a second or further closure of an element. However, in some embodiments, once an element has been identified as being reopened as a result of the passability parameter associated with the segment representing the element passing the second predetermined threshold, the method comprises determining that the element is closed once more if the passability parameter associated with the segment representing the element passes a third predetermined threshold, wherein the third predetermined threshold is associated with a lesser likelihood of closure than the first predetermined threshold. The third predetermined threshold preferably lies between the first and second predetermined thresholds e.g. being associated with a greater likelihood of closure than the second predetermined threshold. Where the second predetermined threshold is variable, the third predetermined threshold is associated with a greater likelihood of closure than the second predetermined threshold at any time e.g. than a final value of the second predetermined threshold. Preferably, where lower levels of the passability parameter indicate a greater likelihood of closure, the third predetermined threshold is a higher threshold than the first predetermined threshold, and preferably a lower predetermined threshold than the second predetermined threshold. The use of a new threshold to identify a further closure of a reopened element is advantageous in ensuring that any closure of the element is detected more rapidly after it has been deemed reopened, helping to reduce the impact of any incorrect determination of reopening.

The method of the present invention, involving determining when an element may be considered to be opened once again, may be performed in relation to all candidate potentially closed elements, or in relation to members of a validated set of elements or segments. Thus the potentially closed element or segment may or may not have undergone validation.

In accordance with the invention in any of its embodiments involving the determination of a closure of a navigable element, once a determination has been made that a closure exists affecting navigable element (preferably following validation), the information may be used in various manners. In some embodiments the method comprises associating data indicative of the existence of the (preferably validated) closure with data indicative of the segment of the electronic map representing the navigable element. The method therefore may comprise storing data indicative of the existence of the (preferably validated) closure, preferably in association with data indicative of the navigable segment. The method may comprise using the determined data indicative of a closure in calculating a route and/or in providing traffic information, e.g. to devices associated with vehicles. The method may comprise providing information indicative of the determined (preferably validated) closure to a third party, e.g. a traffic information provider or a traffic management centre, or directly to one or more remote devices, e.g. navigation devices.

Once a determination has been made that a previously closed navigable element has reopened, the method may comprise generating data indicative of the reopening. The method may comprise modifying data indicative of the existence of the closure associated with data indicative of the segment of the electronic map representing the navigable element to indicate that the element is once again open. For example, a flag indicating that the segment is closed may be removed. The method may comprise storing data indicative of the reopened state, preferably in association with data indicative of the navigable segment. The method may comprise using the determined open state of the element in calculating a route and/or in providing traffic information, e.g. to devices associated with vehicles. The method may comprise providing information indicative of the determined reopened state of an element to a third party, e.g. a traffic information provider or a traffic management centre, or directly to one or more remote devices, e.g. navigation devices. Data indicative of the reopened state may indicate simply that the segment is open, or that it has reopened subsequent to closure i.e. making it clear that the segment was previously closed.

In some embodiments the method may comprise, when an element is identified as being reopened, associating data indicative of the reopened state with data indicative of the segment of the electronic map representing the element. It is useful to be able to determine the closure and reopening history of a segment, as this may ensure that an appropriate threshold is used to assess any further closure of the element e.g. a third predetermined threshold that may be different to the first predetermined threshold used to identify the initial closure of the element. The method may comprise storing data indicative of a passability value history associated with a given segment or segments.

The method may comprise at least one of: displaying the reopening data on a display device; transmitting the reopening data to a remote device for use thereby; and using the reopening data when generating a route through the navigable network represented by the electronic map.

It will be appreciated that in accordance with the invention in any of its embodiments, an element is deemed to be closed when the value of the passability parameter associated with the segment representing the element passes the applicable threshold, e.g. the first or third threshold, in a direction corresponding to an increased likelihood of closure, e.g. falls below the threshold, while an element is deemed to be reopened when the value of the passability parameter associated with the segment representing the element passes the applicable threshold, e.g. the second threshold, in a direction corresponding to an decreased likelihood of closure, e.g. rises above the threshold.

It will be appreciated that the methods in accordance with the present invention may be implemented at least partially using software. It will this be seen that, when viewed from further aspects, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Any reference to comparing one item to another may involve comparing either item with the other item, and in any manner.

It should be noted that the phrase "associated therewith" in relation to one or more segments or elements should not be interpreted to require any particular restriction on data storage locations. The phrase only requires that the features are identifiably related to an element. Therefore association may for example be achieved by means of a reference to a side file, potentially located in a remote server.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF THE PREFERRED EMBODIMENTS

The present invention is, in preferred embodiments at least, directed to methods and systems for determining the closure and/or opening of a road element of a network of road elements. Accurate determination of the existence of road closures and reopenings is important in a navigation system, or simply as additional travel information to drivers. A road closure will have an impact on possible routes between an origin and a destination, necessitating alternative routes around the closed element to be used. In practice, the existence of a road closure has an effect on the road network comparable to a traffic jam of infinite severity. Whether or not a route is pre-calculated, it is important to users of a navigation system to be informed of road closures so that they can take a different route if needed. Conversely, it is important to be able to determine when an element that was previously closed can be considered to be reopened, avoiding the need to e.g. route around the element. The present invention provides a method for automatically detecting closures and subsequent reopenings in a quicker and more reliable manner than possible with conventional approaches.

Figure 1:
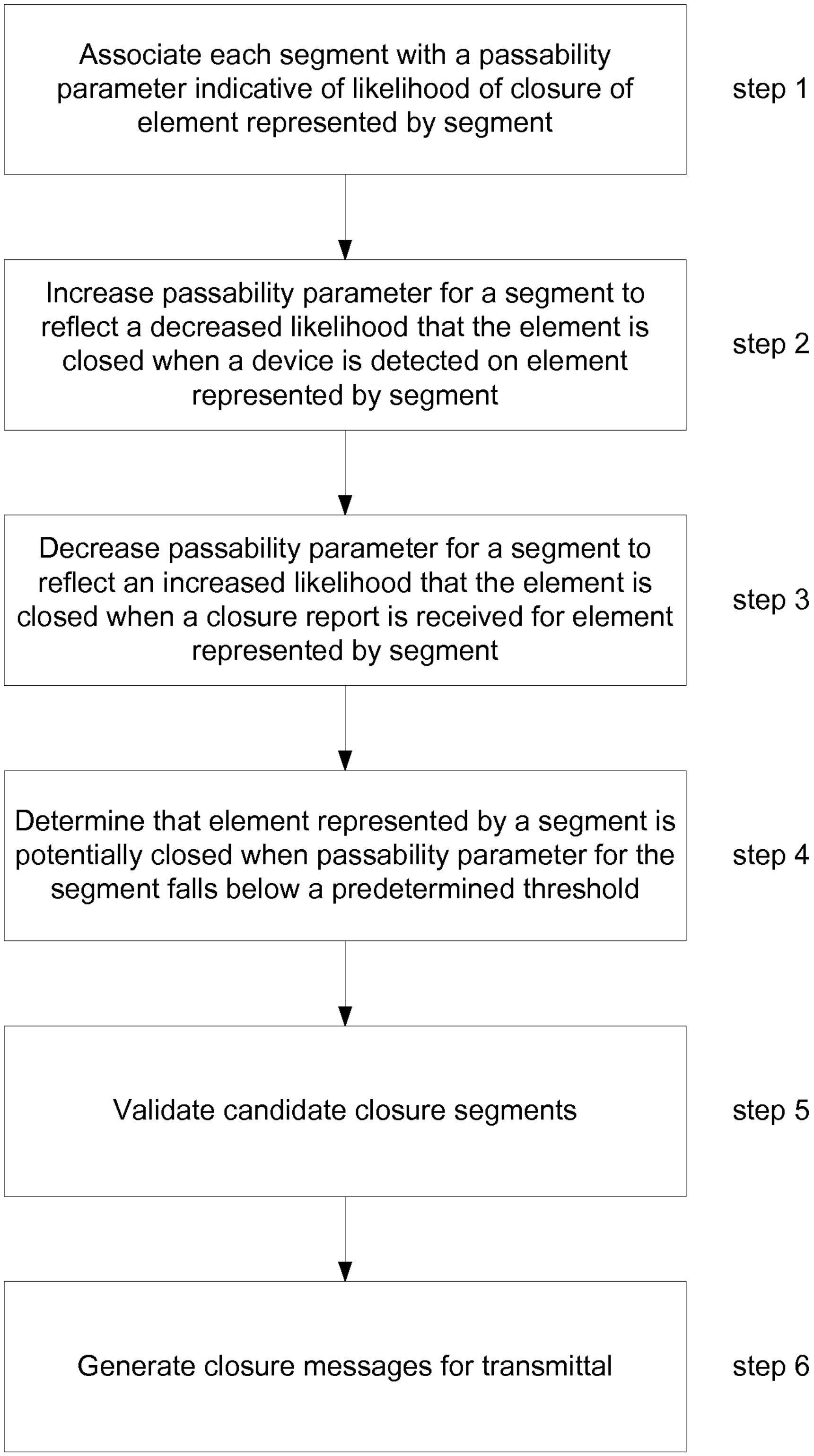
FIG. 1 is a flow chart illustrating the steps of a method for detecting the closure of a road element in accordance with an embodiment of the invention.

A preferred embodiment of the invention will be described by reference to the flow chart of FIG. 1. The method exemplified by FIG. 1 is realised in a live system using live positional data, e.g. GPS probe data available for analysis within a short period of time, e.g. 3 minutes. The probe data is vehicle probe data received from devices associated with the vehicles, e.g. GPS devices, whose position corresponds to that of the vehicle. The probe data may alternatively be referred to as "positional data". The probe or positional data is associated with temporal data, e.g. such that the probe data is a sequence of geographic positions, e.g. defined as latitude and longitude coordinates; each geographic position having an associated time stamp indicating a time at which the vehicle was at the respective position. The probe data can be used to derive probe traces relating to travel of probe vehicles along specific road elements in a road network. The positional data may be matched to road segments of a digital map representing the network of road elements.

Each element of the road network is represented by a segment of an electronic map. The electronic map (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of 3 lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. According to step 1 of the method, each segment is associated with a passability parameter, which is indicative of the likelihood that the road element represented by the segment is closed. The passability parameter is determined using a bounded function, which may vary between 1 and 0, with lower values indicating increased likelihood of closure. The passability parameter decays according to an exponential function with respect to time. More detailed discussion and examples of the passability parameter will be provided below. The value of the passability parameter at any particular time indicates the likelihood of closure of the road element under current conditions, i.e. at the current time.

In accordance with step 2 of the method, whenever a device is detected on the element represented by a segment according to the probe data, the passability parameter for the segment is increased to reflect a decreased likelihood that the element is closed. This is achieved by map matching probe data to the segments of the electronic map, and determining when a device is detected on a particular segment. The detection of each device on the element triggers a step increase in the value of the passability parameter to a higher value. After each step, the passability parameter starts to decay again, from this new starting point, in accordance with the exponential function.

In accordance with the invention, the system further receives closure reports relating to road elements of the network from a number of external sources. These may include reports from any of the following types of source: (i) reports from map users, e.g. provided via navigation devices (or other location aware devices) or websites, e.g. as part of a community map update function, (ii) automatically generated reports, e.g. based upon the actions of users of navigation devices when a device deviates from a planned route, changes heading suddenly, accelerates/decelerates when not expected; (iii) governmental feed, e.g. from the owners or controllers of the road network; (iv) journalistic feed; and (v) human moderated feed. The reports may identify a closure in relation to a single point, navigable element or map segment, or a navigable stretch comprising at least a portion of one or more navigable elements. Where the report identifies a closure by reference to a navigable element or elements of the real world network, the method may involve map matching the data to the segments of the electronic map to identify the segment or segments affected.

In accordance with step 3 of the method, whenever a report is received indicating that a road element represented by a segment of the electronic map is closed, the passability parameter associated with that segment is decreased to reflect an increased likelihood that the element is closed. As with the modification of the passability parameter in response to detection of a device on the element, each report triggers a step decrease in the value of the passability parameter to a lower value. After each step, the parameter starts to decay again. In some embodiments, the size of the stepped decrease in the passability parameter is dependent upon the source of the report, such that more reliable reports, e.g. from a governmental feed, will prompt a larger decrease, potentially to bring the parameter to a value below the threshold prompting a closure finding. Optionally the passability parameter of an adjacent segment or segments of the map may also be decreased and/or or that of a segment representing an element that is known, based on historical data, to be likely to also be closed. The decrease in the passability parameter for these adjacent, or related segments, may be equal to or less than that for the segment to which the report relates.

The passability parameter for each segment of the electronic map is continually monitored. In accordance with step 4 of the method, when the passability parameter associated with a segment falls below a predetermined threshold, it is determined that the element represented by the segment is potentially closed, i.e. that it is a closure candidate. The closure threshold may be set to any desired value.

In step 5, candidate closed segments identified are subjected to a validation process. This involves using external closure reports once more. Where it is found that an closure report has been received in relation to a navigable stretch comprising at least a portion of one or more navigable segments of the network, (if appropriate after map matching), and which stretch overlaps the closure candidate segment, then the segment may be verified as closed, as there is a high degree of confidence that it is indeed closed. In this step, identified candidate closed navigable elements may be used to identify further closed elements. For example, two elements considered to be potentially closed, and which are not connected to one another, may be taken as indicative that there is a closed stretch additionally incorporating a road element or elements connecting the two elements.

The result of the validation process may be a set of road elements, and hence segments that can be assumed to be closed with an appropriate degree of confidence. Data indicative of the road elements whose closure has been validated may be used as desired. For example, the data may be transmitted to another server, or directly to navigation devices or ADAS systems associated with vehicles, for use, for example, in route planning and/or display thereon. The data may be provided as part as a traffic update transmission. Thus, the server may store the data, generate a message indicative thereof, and/or disseminate the data for use by navigation devices or ADAS systems associated with vehicles, or to another server, etc—see step 6 of FIG. 1.

It will be appreciated that validation is optional, and closure data may be generated in respect segments deemed to be potentially closed without further validation.

Figure 7:
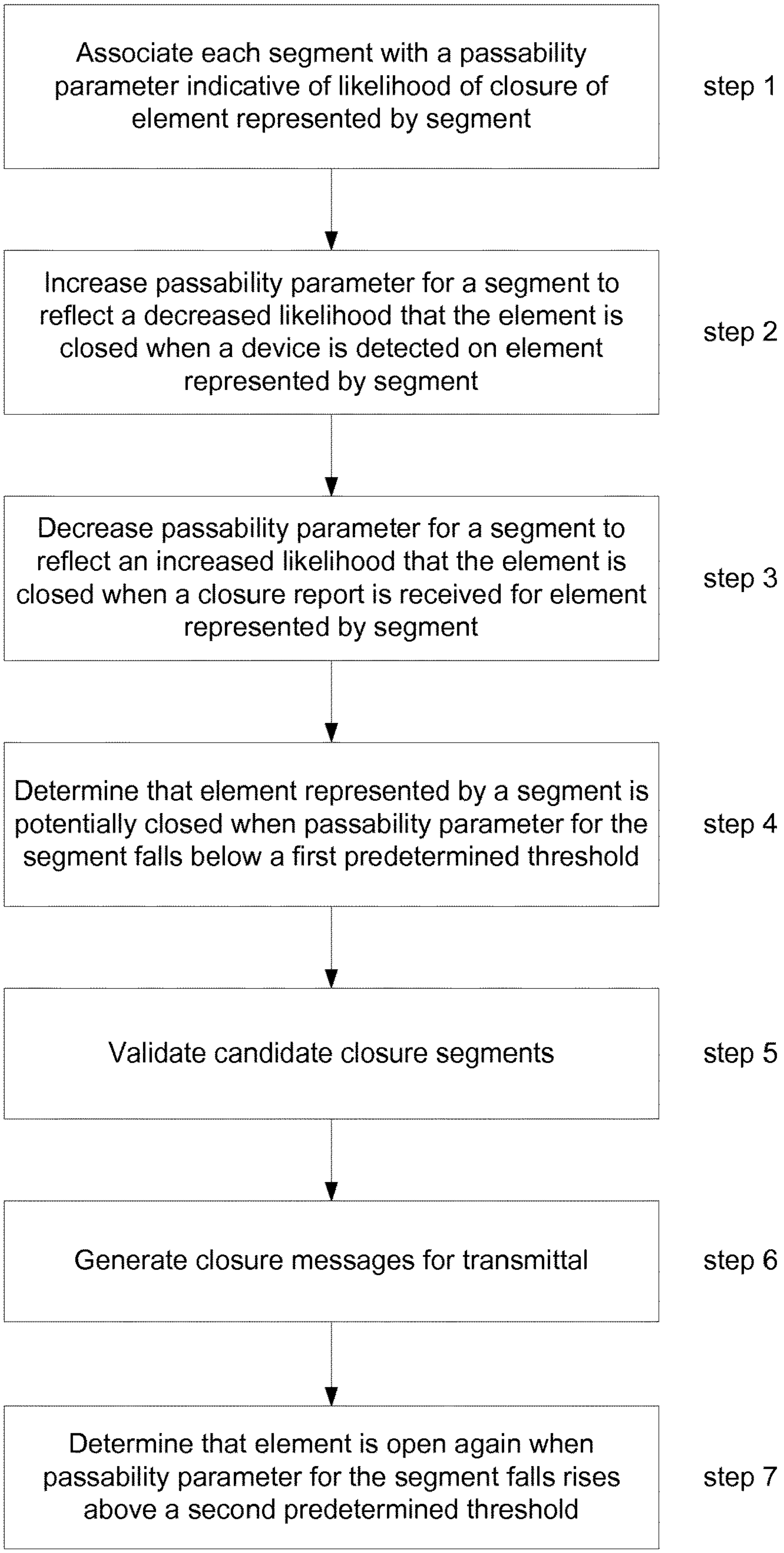
FIG. 7 is a flow chart illustrating the steps of a method for detecting the closure and reopening of a road element in accordance with an embodiment of the invention.

A preferred embodiment of the method of detecting a road closure and subsequent reopening in accordance with the invention will now be described by reference to the flow chart of FIG. 7. The flow chart of FIG. 7 corresponds to that of FIG. 1, except that step 4 now refers to a first predetermined threshold, and there is now a further step 7 which is described in more detail below.

Once closed segments have been identified, whether or not after validation, the method involves continuing to assess probe data relating to the movement of devices along the elements represented by each segment, and reports relating to the closure of the elements represented by the segments, and modifying the passability parameter associated with the segment as previously described. In step 7, when the passability parameter associated with a segment increases above a second predetermined threshold, which is higher than the first predetermined threshold, the segment is determined to have reopened. This may occur, for example, where sufficient probe data is received indicative of the presence of devices on the segment. The first and second predetermined thresholds may be set as desired. For example, the first predetermined threshold may be set at 0.06, and the second predetermined threshold at 0.14.

A determination that an element has been reopened may be used in various manners. When an element has been determined to be reopened data indicative of the open state of the element may be stored associated with the segment indicative of the element, a message indicative of the reopening of the element may be generated and/or the data may be disseminated for use by navigation devices or ADAS systems, or another server etc., in the same way as with the closure data.

In some embodiments the method may involve determining whether there is any closed segment adjacent a segment that represents an element that has been reopened, and determining that any such segments have also reopened at the same time, so as to ensure that a navigable stretch that has closed reopens as one.

Figure 2:
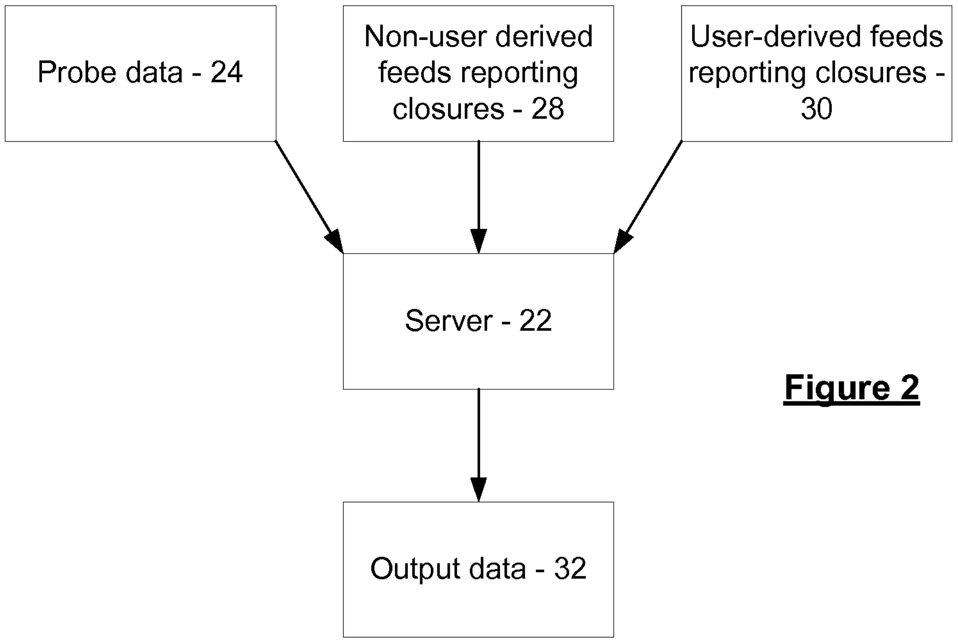
FIG. 2 shows a system which may be used to implement the methods of the invention.

FIG. 2 illustrates an exemplary system which may be used to implement the method of the invention. The system includes a server 22 which performs the method of the present invention. The server receives various inputs. The server 22 receives GPS probe date 24, non-user derived external feeds reporting closures 28, such as government feeds, journalistic feeds, etc, and user derived closure reports 30, e.g. user initiated reports or reports determined automatically from user behaviour, e.g. of devices associated with the user. The server 22 uses these various inputs in providing the output data 32, which can be closure data and/or reopening data.

Some more details will now be given regarding an exemplary implementation of the passability parameter.

The passability parameter for a segment is indicative of the likelihood of closure of the segment, and is based upon the relative flow along the segment over time. The relative flow along the segment is quantified by an expected visit interval for the segment. The expected visit interval for the segment is the expected time interval between two consecutive probes being detected on the segment. One way in which the expected visit interval may be determined will be described below.

The passability parameter for the segment decreases exponentially over time t by a rate that is based on the expected visit interval. For example, the passablity parameter can be defined as:

$$\text{passability}(t)=\text{passability}(t=0)e^{-\beta t}$$

The decay rate β is inversely proportional to the expected visit interval, and wherein the constant of proportionality may be a parameter used to correct for various effects or artefacts associated with the measurements of probe traces. For example, the parameter may define the flow expected in a closure, as, for various reasons, it has been found that traces may still be observed over the segment even in the event of a closure. It will be seen that the rate of decay of the passability will be greater where the visit interval is smaller, and smaller where the visit interval is greater. This is because devices are expected to be detected less frequently on segments with a greater visit interval. By using a slower rate of decay for such segments, the likelihood of premature attaining of the closure threshold is reduced, so that it should only be obtained when there is a real likelihood of closure of the segment. Conversely, where there is a lower visit interval for a segment, the closure threshold should still be reached where appropriate.

Each time a device is detected on the road element represented by the segment, the passability is increased by a discrete jump (of a fixed amount). Each time a closure report is received indicating that the road element represented by the segment is closed, the passability is reduced by a discrete jump. The jump may be of the same or different amount to that used when increasing the parameter, and the size of the jump may vary depending upon the nature of the report, or may be of fixed sized. Each time the value of the parameter jumps up or down, it will begin to decay in accordance with the exponential function from the new starting value.

When the passability parameter value drops below a certain threshold value, it is determined that the element represented by the segment is potentially closed.

It will be appreciated that the level of the threshold for closure determination, and the size of the jumps on detection of devices/receipt of closure reports may be set as desired for a given system.

The expected visit interval may be based on an average visit interval for the segment. The average visit interval can be determined using historic probe data and updated periodically. For example, the expected visit interval may be based on an average visit interval for the segment over a month, and updated monthly. This average may be a simple arithmetic average and/or an exponential moving average.

However, by its nature, the expected visit interval is likely to be highly dynamic depending on the daily traffic pattern over the segment. The expected visit interval preferably reflects this time dependence. In preferred embodiments, rather than determining many different average visit intervals for the segment applicable to different times or time periods (although this is possible), an appropriately time dependent expected visit interval may be determined by appropriately scaling a given average visit interval for the segment, e.g. determined over a monthly period (or other time period as desired).

That is:

$$\text{expected visit interval} = \text{average visit interval} \times \text{scaling factor}$$

The scaling factor is time dependent, and will generally contain information about either the current flow in the vicinity of the segment or the expected flow at that time of the day. For instance, the scaling factor may be determined dynamically based on the current number of connected devices, i.e. probes in the system. Particularly:

$$\text{scaling factor} = \frac{\text{average number of concurrent probes}}{\text{current number of concurrent probes}}$$

The average number of concurrently connected devices (or probes) may be based upon data collected over a suitable time period, e.g. 1 month. Storing, and dynamically scaling, a single average visit interval for each segment is generally more numerically efficient than storing the multiple such average visit intervals as a function of time.

In this way, the expected visit interval for a given time, and hence the decay rate of the passability, is adjusted depending on the current conditions. Where there are a large number of currently connected devices, e.g. during rush hour, the expected visit interval will be shorter and the passability will decay more rapidly. The expected visit interval may be recalculated for each point in time, or such an interval may be determined using current data that is then considered to be applicable for a given time period, e.g. 15 minutes.

It will be appreciated that the above description of the passability parameter is only exemplary, and other forms of the parameter may be used. Furthermore, scaling of the parameter to reflect current conditions may be achieved in other manners, not necessarily through the decay function, e.g. by adjusting the height of the "jumps", or multiplying the exponential function by a time dependent scaling factor.

Figure 3:
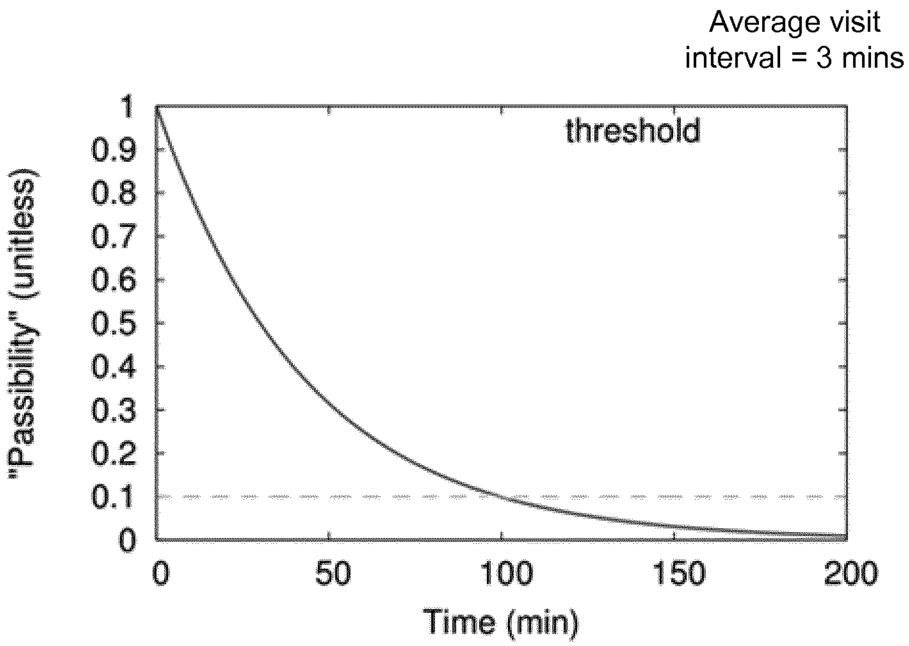
FIG. 3 illustrates the decay of the passability parameter for a road segment with respect to time.

FIG. 3 illustrates in a simplified arrangement how the passability parameter for a segment may decay exponentially with time if it is not increased or decreased through detection of probes on the element represented by the segment, or by closure reports relating to the element represented by the segment. In this example, the closure threshold is shown at 0.1. However, this is merely exemplary. The expected visit interval (here, for simplicity, being a constant visit interval which does not change over the timeframe shown) is 3 minutes.

Figure 4:
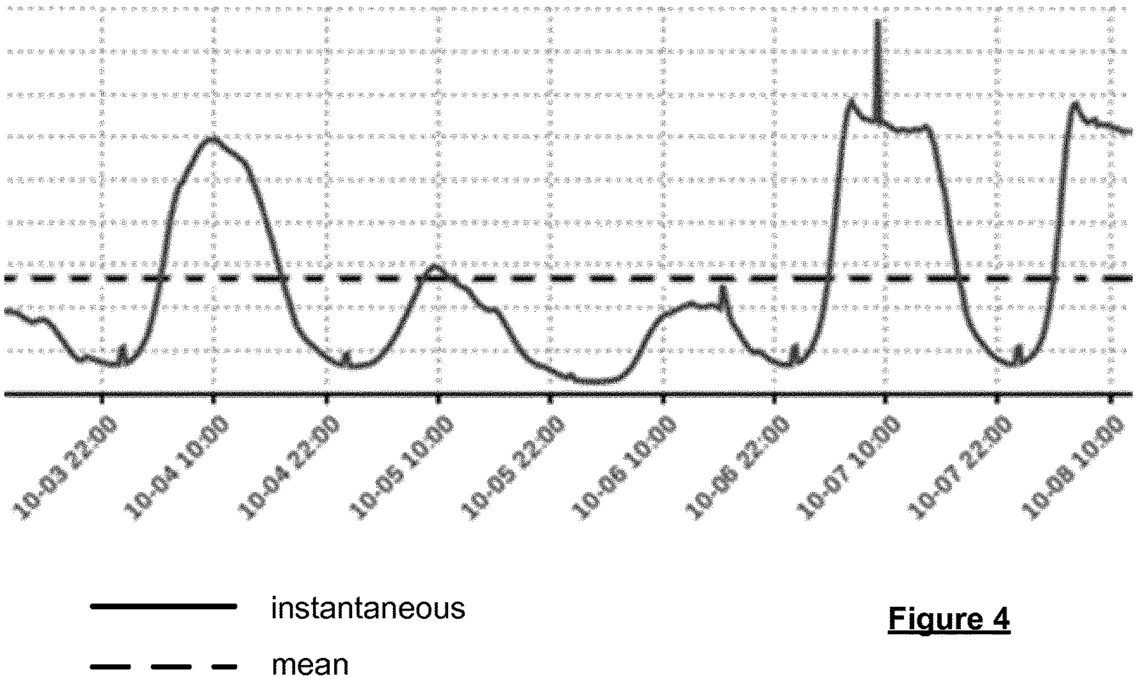
FIG. 4 illustrates the variation in concurrent probe numbers in the system at different times.

FIG. 4 illustrates the variation in the number of concurrent probes detected in the system with respect to time. More specifically, the solid line shows the variation in the instantaneous count of concurrent probes in the system over a series of days, i.e. 3 October at 22 h00 to 4 October at 10 h00 through to 8 October at 10 h00, and the dotted line shows the average (or mean) count of concurrent probes in the system. This therefore illustrates indirectly how the expected visit interval for a segment might be expected to change over time depending upon traffic patterns.

Figure 5:
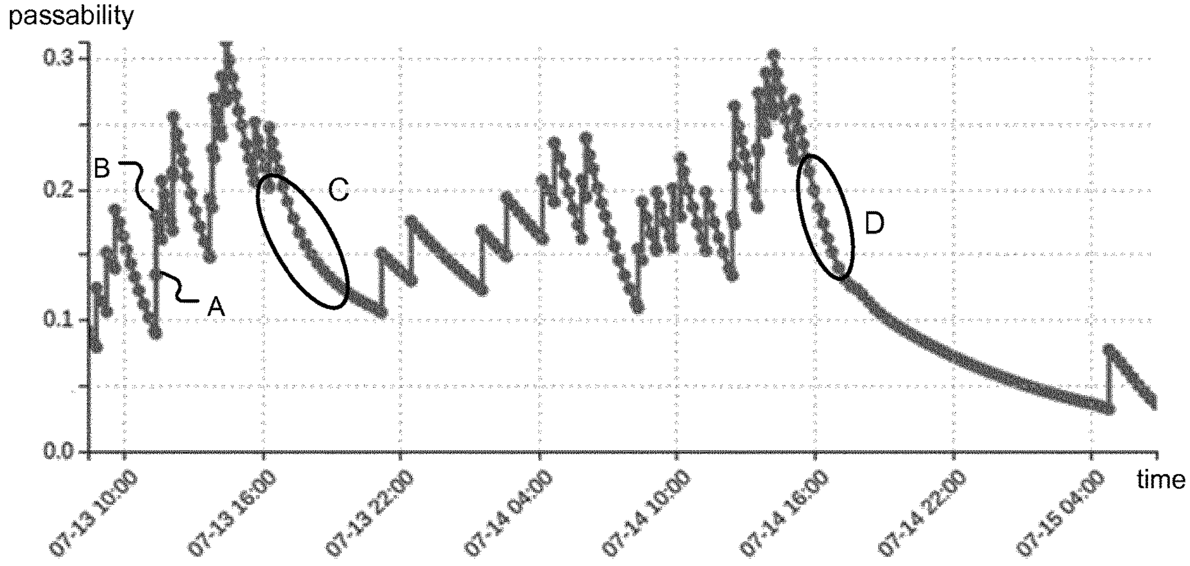
FIG. 5 illustrates the variation in passability parameter with respect to time in one exemplary embodiment.

FIG. 5 illustrates the variation in passability parameter for a segment in accordance with an embodiment of the invention. Each detection of a device on the element represented by the segment prompts an increase in the parameter, to reduce the likelihood of closure indicated thereby, e.g. as illustrated by points A and B. Conversely each closure report received prompts a jump decreasing the parameter (not shown) increasing likelihood of closure. As soon as the value of the parameter has jumped in either direction, it starts to decay once more, until the next jump occurs. This figure also shows how the rate of decay varies at different times, based upon the change in expected visit interval. For example, the rate of decay in region C is less steep than in region D, corresponding to a time when the expected visit interval was greater.

Figure 6:
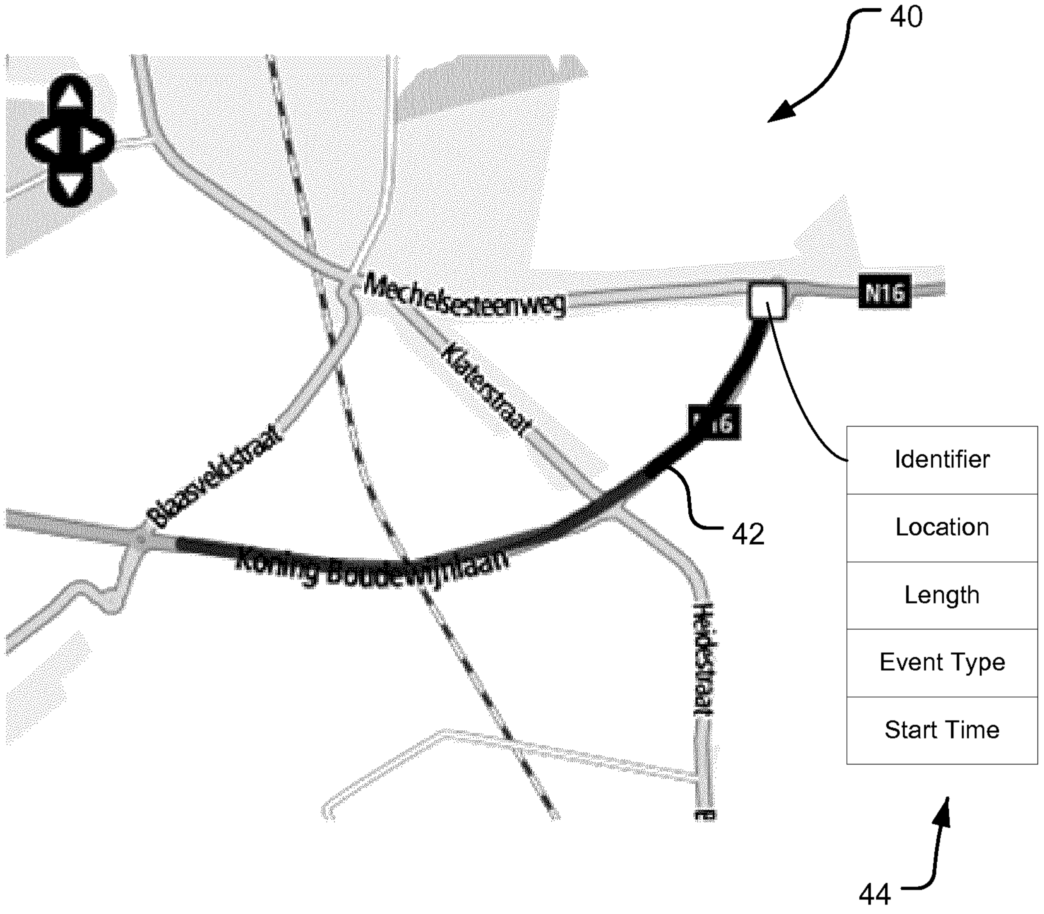
FIG. 6 shows a visual representation of a digital map with an indication of a determined road closure.

FIG. 6 shows a visualisation 40 of the road network geographic area created using data from a digital map representative of the road network. Following the completion of the method depicted in FIG. 1, a road stretch 42 has been identified as being closed. A message 44 associated with the determined road closure is generated, e.g. for transmittal to route planning or navigation device, or to a traffic management centre, contains information such as: an identifier; a location (e.g. with respect to the digital map); a length of the road stretch determined to be closed; an event type identifier (in this case identifying that the stretch of road is closed); and a start time (indicating when the stretch was first determined to be closed).

The setting of the second predetermined threshold used to identify the reopening of an element will now be described in more detail. It will be appreciated that the second predetermined threshold always remains above the first predetermined threshold. In some embodiments the second predetermined threshold is a fixed threshold having one of two different values. Where the determination of the closure of an element was based upon an absence, or insufficient quantity of probe data alone, without the receipt of an external closure report, the second predetermined threshold is set to a first, lower value. Where the determination of the closure was based additionally upon the receipt of one or more external closure report, the second predetermined threshold is set to a second, higher value. By way of example only, the first value might be 0.14 and the second value 0.23. This reflects that a closure determination based at least in part upon the receipt of an external closure report is likely to be more reliable than such a determination based upon probe data alone, and hence can be associated with a greater level of confidence that the element really is closed. Thus, in order for the element to be deemed to have reopened, a greater increase in the passability parameter for the segment representing the element is required where the determination was based at least in part on the receipt of an external closure report than in the case where the determination was based on probe data alone. This ensures that an element is determined to be reopened more rapidly in situations where it may have been erroneously closed due to unreliable or insufficient probe data.

Figure 8:
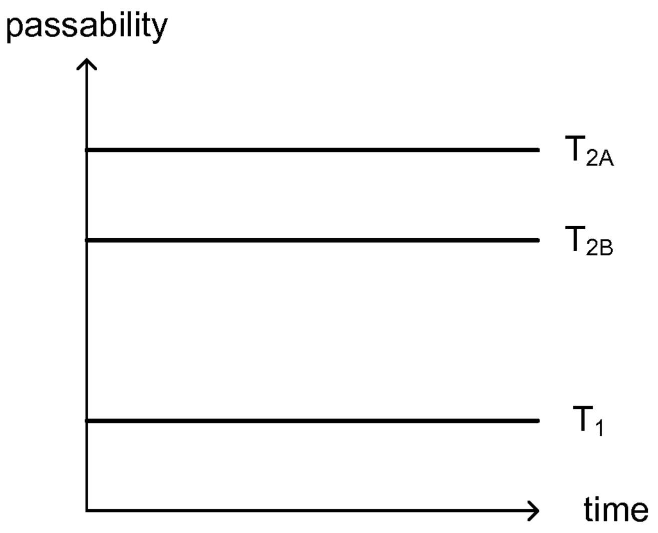
FIG. 8 illustrates a set of thresholds which may be used to determine the closure and reopening of a road element in accordance with one embodiment of the invention.

FIG. 8 illustrates schematically the relative values of the first and second thresholds in these embodiments. The first threshold, used to determine the closure of an element, is labelled $T_1$. The two possible values for the second threshold are labelled $T_{2A}$ and $T_{2B}$. The higher second threshold $T_{2A}$ is used where an element represented by a segment was determined to be closed after receipt of one or more external report, while the lower threshold, $T_{2B}$ is used where the element was determined to be closed based upon consideration of probe data alone. Here it can be seen that the first threshold $T_1$ corresponds to a passability value that is lower than either value that the second threshold may have.

A further embodiment will now be described in which the second predetermined threshold varies over time in accordance with a predetermined function between an initial value and a final value. The first threshold used to determine closure is again labelled $T_1$. The second threshold used to determine reopening of the element is $T_2$, and decays according to an exponential function between an initial value, $T_{21}$, and a final value, $T_{2F}$. This embodiment may be used where an element has been determined to be closed based on receipt of an external closure report. The external closure report is associated with a start time indicating when the closure takes effect. For example, the report may be a government report, which is typically associated with such data. At this time, $t_0$, the value of the passability parameter for the element is decreased below the first threshold, $T_1$, resulting in a determination of closure. At the same time, the second predetermined threshold starts to decay from the initial value, $T_{21}$ toward a final value, $T_{2F}$. This decay may occur at any suitable rate, e.g. having a half-life of 30 minutes. The final value of the second predetermined threshold, $T_{2F}$, corresponds to the value $T_{2A}$ used in the FIG. 8 embodiment, where the second threshold was fixed, being the appropriate threshold for use where a closure determination is based at least in part on receipt of an external closure report. It will be noted that the second predetermined threshold always remains above the first predetermined threshold, which is fixed. In this embodiment, the second predetermined threshold decays from an initially higher value to its usual value. This helps to prevent a small amount of probe data indicative of the detection of devices on the element causing the passability parameter associated with the segment representing the element pushing the passability value up over the second threshold too soon after the closure determination. This helps to avoid a rapid change between closed and open states as a result of the detection of a few devices on the element. The increase in the passability parameter required to cause the parameter to exceed the second threshold decreases over time, i.e. the level of hysteresis decreases.

Figure 9:
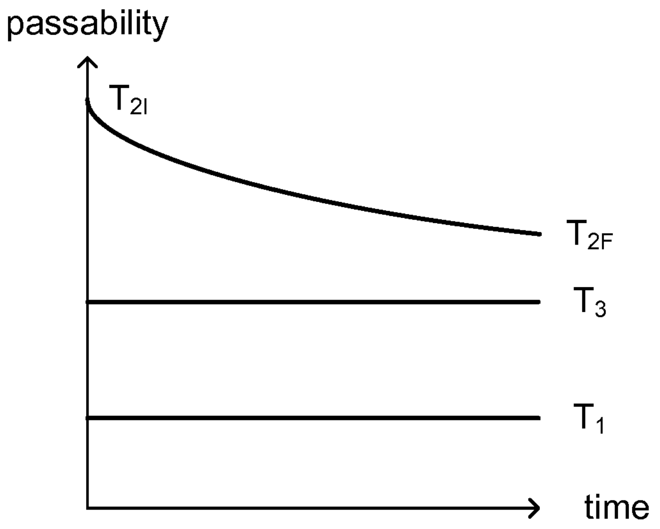
FIG. 9 illustrates a set of thresholds which may be used to determine the closure and reopening of a road element in accordance with another embodiment of the invention.

Also shown in FIG. 9 is a third predetermined threshold $T_3$. Once an element has been determined to be reopened following a closure, the first predetermined threshold may no longer be used to identify any further closure of the element. Instead a third predetermined threshold, $T_3$, is used, which is higher than the first predetermined threshold, but still lower than the second predetermined threshold. This ensures that a subsequent closure is more rapidly detected. A subsequent closure being detected may indicate that the finding that the element had reopened was unreliable, and thus it is advantageous to ensure the element is rapidly closed once more.

It will be appreciated that if the external report is no longer valid, e.g. if it expires, the passability parameter value associated with the segment representing the element may be increased above all of the thresholds.

Figure 10:
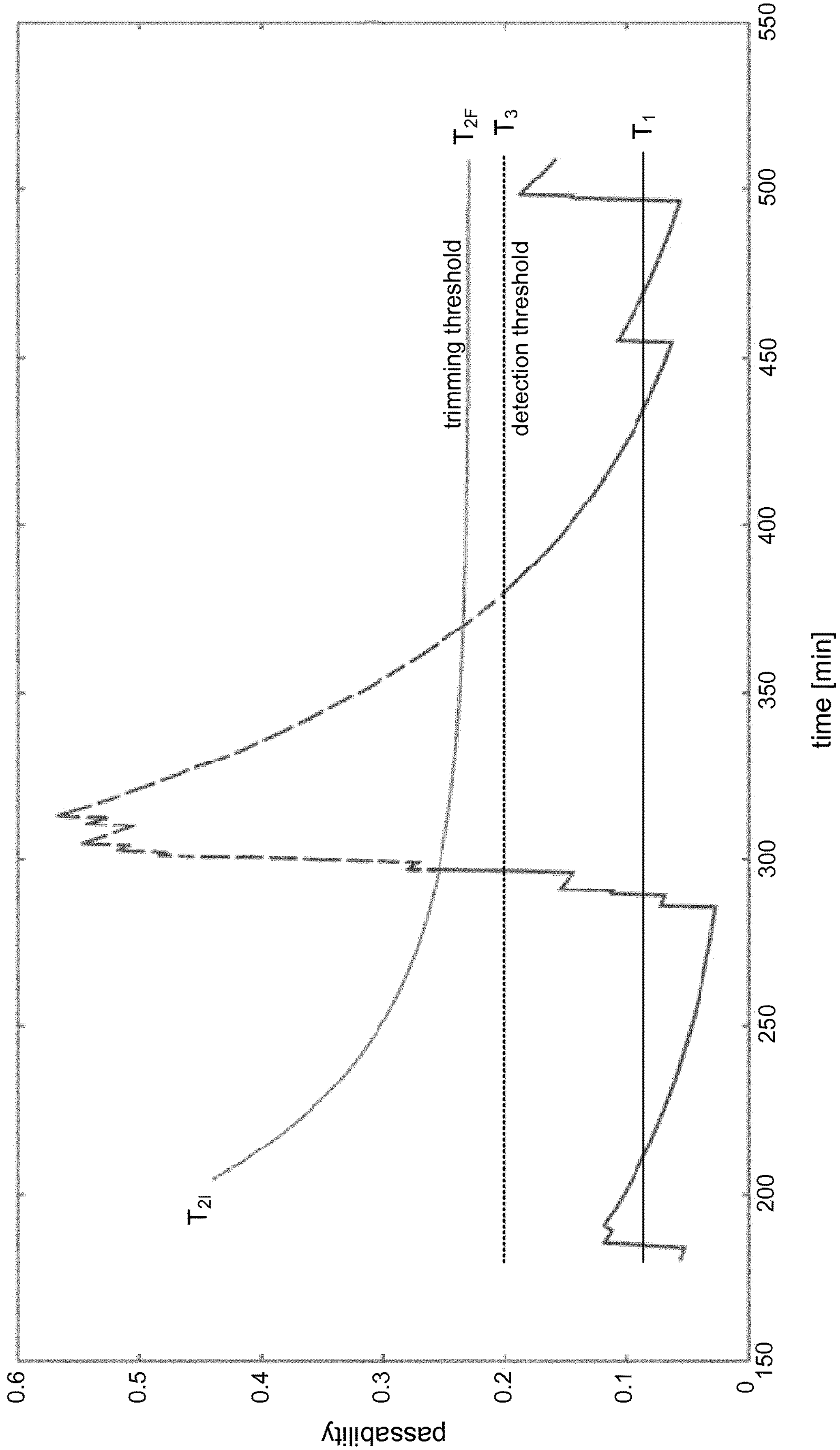
FIG. 10 illustrates the way in which thresholds of the type shown in FIG. 9 may be used to identify the opening of a road element.

FIG. 10 illustrates one exemplary arrangement showing the interaction of thresholds of the type shown in FIG. 9 with the changing passability parameter associated with a segment over time. The value of the passability parameter associated with the segment is shown by the line having solid sections and dotted sections. The solid sections indicate that the navigable element, e.g. road, represented by the segment is closed, while the dotted section indicates that the navigable element, e.g. road, is open. Therefore, as can be seen, the element is initially closed according to the passability parameter. The second threshold starts to decay from an initial value $T_{21}$ of 0.45. This may have a half-life of 30 minutes, although this is merely exemplary. The second threshold relaxes toward a final value, $T_{2F}$, of 0.25. A third predetermined threshold, $T_3$, is used to identify when a previously reopened element is closed again, and is set at 0.18. The passability value of the element increases in steps whenever probe data indicates that a device has been detected along the element, while decaying according to an exponential function at all times between such discrete steps as described in the earlier embodiments e.g. FIG. 5. After around 300 minutes the value of the passability parameter has increased above the second threshold, resulting in the element being determined to be open once more. It will be seen that the element is not deemed to be reopened until the second threshold is reached, which is above the first threshold. After around 380 minutes, the passability value has fallen again to such an extent that it has passed the third threshold, resulting in a further finding of closure. It will be noted that the element is deemed closed as soon as the higher third threshold is reached, without needing to reach the first threshold $T_1$. The state of the element remains as closed until such time as it passes the applicable value of the second predetermined threshold. If at any time the external closure report expires, or is no longer reported, the value of the passability parameter is increased above all thresholds, e.g. to 0.75.

The value of the passability parameter associated with the segment is continually logged. Furthermore, whenever the segment is determined to be closed, reopened or reclosed (and so on), this is logged. By maintaining a history of the closed and open states and values of the passability parameter associated with the segment, it may be ensured that the appropriate values of the thresholds are used, e.g. the higher closure detection threshold in the case of a further closure.

Finally, it should be noted that whilst the accompanying claims set out particular combinations of features described herein, the scope of the present invention is not limited to the particular combinations of hereafter claims, but instead extends to encompass any combination of features or embodiments herein disclosed irrespective of whether or not that particular combination has been specifically enumerated in the accompanying claims at this time.

The invention claimed is:

1. A method of detecting the opening of a navigable element forming part of a network of navigable elements within a geographic area, the navigable elements being represented by segments of an electronic map, wherein at least some of the segments of the electronic map are each associated with data indicative of a passability parameter for the segment, the passability parameter being indicative of the likelihood of the navigable element represented by the segment being closed, wherein the value of the passability parameter varies according to a predefined function with respect to time such that the likelihood of the navigable element being closed increases with respect to time, said method comprising:

obtaining positional data relating to the movement of a plurality of devices along the navigable elements of the navigable network with respect to time;

modifying, for each of one or more segments, the value of the passability parameter associated with a segment such that the likelihood of the navigable element represented by the segment being closed is decreased, when the positional data indicates that a device has been detected traversing the navigable element;

modifying, for each of one or more segments, the value of the passability parameter associated with a segment such that the likelihood of the navigable element represented by the segment being closed is increased, when a report is received from an external source indicative of the navigable element being closed; and identifying a potentially closed navigable element as being opened when the value of the passability parameter associated with the segment representing the navigable element passes a predetermined threshold value.

2. The method of claim 1, wherein the predefined function causing the passability parameter to vary with respect to time is an exponential function.

3. The method of claim 1, wherein the modification of the value of the passability parameter associated with a segment due to the detection of a device traversing the navigable element and/or the receipt of a report indicative if the navigable element being closed is a discrete step in the value of the passability parameter.

4. The method of claim 3, wherein the discrete step provides a new starting point from which the value of the parameter then varies with respect to time.

5. The method of claim 1, wherein the predetermined threshold value is: (i) a first value when the navigable element was determined to be potentially closed without modification of the passability parameter as a result of the receipt of a report from an external source that the navigable element was closed; and (ii) a second value when the navigable element was determined to be potentially closed after modification of the passability parameter as a result of the receipt of one or more reports from an external source that the navigable element was closed, wherein the first value is indicative of a lesser likelihood of closure than the second value.

6. The method of claim 1, wherein a navigable element is identified as being potentially closed when the value of the passability parameter associated with the segment representing the navigable element passes a first predetermined threshold value, and wherein the predetermined threshold value used to identify the navigable element as being reopened is a second predetermined threshold value, wherein the second predetermined threshold value is indicative of a lesser likelihood of closure than the first predetermined threshold value.

7. The method of claim 6, wherein the second predetermined threshold value varies over time from an initial value to a final value, wherein the final value of the second predetermined threshold value is indicative of a lesser likelihood of closure than the first predetermined threshold value.

8. The method of claim 7, wherein the second predetermined threshold value varies according to a predefined function with respect to time, optionally wherein the predefined function is an exponential function.

9. The method of claim 1, wherein the predetermined threshold value is: (i) a first value when the navigable element was determined to be potentially closed without modification of the passability parameter as a result of the receipt of a report from an external source that the navigable element was closed; and (ii) a second value when the navigable element was determined to be potentially closed after modification of the passability parameter as a result of the receipt of one or more reports from an external source that the navigable element was closed, wherein the first value is indicative of a lesser likelihood of closure than the second value, wherein the second predetermined threshold value varies over time from an initial value to a final value, wherein the final value of the second predetermined threshold value is indicative of a lesser likelihood of closure than the first predetermined threshold value, wherein the final value of the second predetermined threshold value is set to said first or second value as appropriate.

10. The method of claim 7, wherein the second predetermined threshold value is arranged to vary with respect to time when the passability value associated with the segment representing the navigable element has passed the first threshold value to result in the navigable element being identified as potentially closed as a result of the receipt of a report from an external source that the navigable element was closed.

11. The method of claim 7, comprising modifying the passability parameter associated with a segment so that the value of the passability parameter passes the first predetermined threshold value once a report from an external source that the navigable element was closed is received, and providing a second predetermined threshold value that varies from an initial value to a final value over time, wherein the initial value is indicative of a lesser likelihood of closure than the final value.

12. The method of claim 11, comprising identifying the navigable element as being closed and setting the second predetermined threshold value to the initial value at a start time associated with the report.

13. The method of claim 6, further comprising, once an navigable element has been identified as being reopened, determining that the navigable element is closed once more if the passability parameter associated with the segment representing the navigable element passes a third predetermined threshold value, wherein the third predetermined threshold value is associated with a lesser likelihood of closure than the first predetermined threshold value and a greater likelihood of closure than the second threshold value.

14. The method of claim 1, further comprising modifying the value of the passability parameter associated with one or more further closed navigable segment connected to a segment representing an element identified as being reopened in a manner to result in the or each further navigable segment also being identified as open.

15. The method of claim 1, further comprising, once a determination has been made that a previously closed navigable element has reopened, (i) modifying data indicative of the existence of the closure associated with data indicative of the segment of the electronic map representing the navigable element to indicate that the element is once again open and/or (ii) generating data indicative of the reopening and/or (iii) associating data indicative of the reopened state with data indicative of the segment of the electronic map representing the element.

16. The method of claim 15, further comprising at least one of: displaying the reopening data on a display device; transmitting the reopening data to a remote device for use thereby; and using the reopening data when generating a route through the navigable network represented by the electronic map.

17. The method of claim 1, wherein the passability parameter is based upon an expected time interval between consecutive devices being detected on the segment.

18. A system configured to detect the opening of a navigable element forming part of a network of navigable elements within a geographic area, the navigable elements being represented by segments of an electronic map, wherein at least some of the segments of the electronic map are each associated with data indicative of a passability parameter for the segment, the passability parameter being indicative of the likelihood of the navigable element represented by the segment being closed, wherein the value of the passability parameter varies according to a predefined function with respect to time such that the likelihood of the navigable element being closed increases with respect to time, said system comprising: a processing resource configured to obtain positional data relating to the movement of a plurality of devices along the navigable elements of the navigable network with respect to time;

modify, for each of one or more segments, the value of the passability parameter associated with a segment such that the likelihood of the navigable element represented by the segment being closed is decreased, when the positional data indicates that a device has been detected traversing the navigable element;

modify, for each of one or more segments, the value of the passability parameter associated with a segment such that the likelihood of the navigable element represented by the segment being closed is increased, when a report is received from an external source indicative of the navigable element being closed; and identify a potentially closed navigable element as being opened when the value of the passability parameter associated with the segment representing the navigable element passes a predetermined threshold value.

19. A computer program product on a non-transitory computer readable medium, the computer program product comprising computer readable instructions executable to perform a method of detecting the opening of a navigable element forming part of a network of navigable elements within a geographic area, the navigable elements being represented by segments of an electronic map, wherein at least some of the segments of the electronic map are each associated with data indicative of a passability parameter for the segment, the passability parameter being indicative of the likelihood of the navigable element represented by the segment being closed, wherein the value of the passability parameter varies according to a predefined function with respect to time such that the likelihood of the navigable element being closed increases with respect to time, said method comprising:

obtaining positional data relating to the movement of a plurality of devices along the navigable elements of the navigable network with respect to time;

modifying, for each of one or more segments, the value of the passability parameter associated with a segment such that the likelihood of the navigable element represented by the segment being closed is decreased, when the positional data indicates that a device has been detected traversing the navigable element;

modifying, for each of one or more segments, the value of the passability parameter associated with a segment such that the likelihood of the navigable element represented by the segment being closed is increased, when a report is received from an external source indicative of the navigable element being closed; and identifying a potentially closed navigable element as being opened when the value of the passability parameter associated with the segment representing the navigable element passes a predetermined threshold value.

* * * * *